United States Patent

[11] 3,594,862

| [72] | Inventor | Charles L. Seefluth<br>Bartlesville, Okla. |
|---|---|---|
| [21] | Appl. No. | 783,604 |
| [22] | Filed | Dec. 13, 1968 |
| [45] | Patented | July 27, 1971 |
| [73] | Assignee | Phillips Petroleum Company |

[54] INTERNAL HEATING OF ROTATING PARISON
3 Claims, 10 Drawing Figs.

[52] U.S. Cl................................................. 18/5 BH,
    18/6 R, 18/17 R, 18/38, 18/Dig. 13, 18/DIG. 39,
                                                  219/389
[51] Int. Cl..................................................... B29b 3/00
[50] Field of Search........................................... 18/5 BH, 6
    M, 38, 17 M, 13; 264/97, 98, 99; 219/389, 405,
                                             411; 34/104

[56] References Cited
UNITED STATES PATENTS
2,354,100   7/1944   Bowen........................... 219/389

| 3,052,789 | 9/1962 | Trainor | 219/354 X |
| 3,283,046 | 11/1966 | De Witt | 18/5 X |
| 3,319,351 | 5/1967 | Sprissler | 219/389 X |
| 2,792,593 | 5/1957 | Hardgrove | 18/5 BZ X |
| 3,072,959 | 1/1963 | Leeds | 18/5 BR X |

FOREIGN PATENTS
529,152   9/1921   France ........................ 219/35.3

*Primary Examiner*—J. Spencer Overholser
*Assistant Examiner*—Ben D. Tobor
*Attorney*—Young and Quigg

ABSTRACT: A rotating parison is heated with an internal radiant heating means, said parison being disposed within a sleeve during the heating step to allow supplemental heat to be added from the outside of the parison. A shield, tapering toward the ends, can be provided around the heating means to provide even heating, or if controlled variation in heating along the axis is desired, the heating means can comprise a member having variable turns of resistance wire along its axis or variable axially disposed loops.

PATENTED JUL 27 1971

INVENTOR.
C. L. SEEFLUTH
BY
Young & Quigg.
ATTORNEYS

INVENTOR.
C. L. SEEFLUTH

BY
*Young + Quigg*

ATTORNEYS 3,594,862

INTERNAL HEATING OF ROTATING PARISON

BACKGROUND OF THE INVENTION

This invention relates to a process and apparatus for heating a preformed hollow parison.

While the blow molding art goes back over 100 years, it has only been in the last 10 years that the blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since the orientation occurs at a temperature below the crystalline melt point while polymer is on a heating cycle, it was early recognized that little orientation could be effected in a conventional blow molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength, and surprisingly, in the case of materials such as polypropylene, greatly improved optical properties.

However, since the optimum temperature for orientation is that just below the crystalline melt point of the material comprising the thermoplastic parison, it is apparent that special care must be taken in heating the parison. Furthermore, as a matter of economics, it is much preferred to form the parison preforms simply by extruding a continuous length of tubing and severing said tubing to give individual parisons of a measured length, as opposed to injection molding a preform with an integral closed end. However, it has been found that the temperature at which maximum orientation occurs is below the optimum temperature for achieving the seal necessary to close one end of a parison formed by simply cutting sections from a continuous length of extruded tubing. Thus, while it is desired to have the parison substantially uniformly heated to a temperature just below the crystalline melting point, it is further desired to have the interior of the parison, at least at the end which is to be sealed, at a slightly higher temperature, so that a true fusion seal can be achieved in an area which is to be pinched off to close one end of the parison.

SUMMARY OF THE INVENTION

It is an object of this invention to provide for substantially uniform heating of a preformed hollow parison. It is further object of this invention to provide for heating a preformed hollow parison to a temperature wherein one end can be sealed and the parison walls strengthened by molecular orientation during a fabrication step. It is yet a further object of this invention to provide for heating the major portion of a parison to a temperature at which molecular orientation occurs on stretching while heating the interior of said parison to a slightly higher temperature, which is conducive to fusion sealing. It is still yet a further object of this invention to heat a thermoplastic parison uniformly in the circumferential direction while controlling an axial gradient in heat.

In accordance with this invention, a preformed hollow thermoplastic parison is positioned within a sleeve and rotated about an internally disposed radiant heating means.

BRIEF DESCRIPTION OF THE DRAWINGS

In the drawings forming a part hereof, wherein like reference characters represent identical parts in the various views.

DESCRIPTION OF THE PREFERRED EMBODIMENTS

Figure 1:
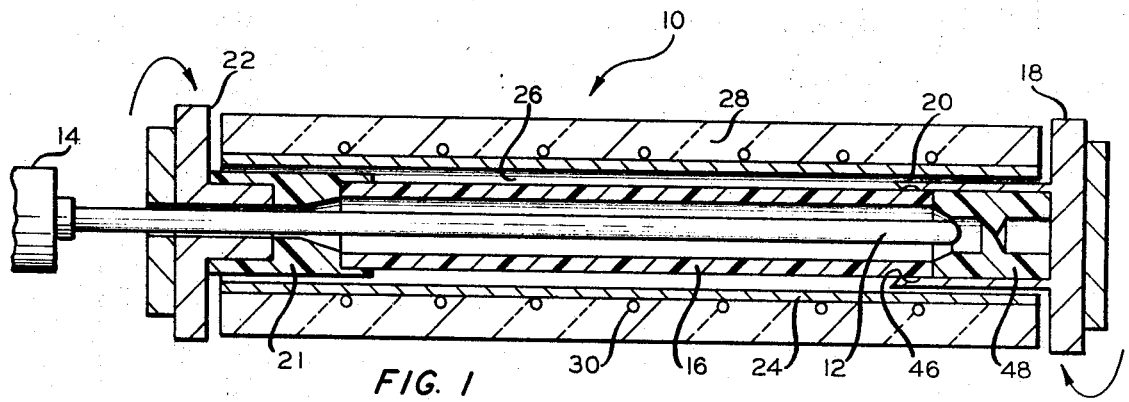
FIG. 1 is a cross-sectional view of an apparatus for rotating a hollow tubular parison about a heating means.

The novel heating method of the instant invention can be used in the heating of hollow thermoplastic parison preforms made, for instance, of any orientable thermoplastic materials such as polymers of at least one 1-olefin, said 1-olefin having two to eight carbon atoms per molecule, poly(vinyl chloride) and the like. It is especially useful in the heating of parisons made from polymers of 1-olefin selected from the group consisting of ethylene, propylene, butene, and mixtures thereof, more particularly, polypropylene.

These polymers can be formed into hollow parison preforms and cooled to a temperature below their crystalline freezing point. A presently preferred method of fabricating these preforms is simply to extrude a continuous length of tubing which is severed into individual parisons of the desired length. These hollow parison preforms in the solid state are then heated by means of the instant invention so that the bulk of the material being heated is brought to a substantially uniform temperature about 1° to about 50° F. below the crystalline melting point of said thermoplastic material. Since the principal heating means is disposed within the hollow parison, the hottest area of the parison will be the inner surface which is preferably in a molten condition. Thus, the outer 75 to about 99, preferably 95 to about 99 percent of the parison will be at orientation temperature which is just below the crystalline melting point of the thermoplastic material comprising the parison while the inner surface is in a molten condition and thus susceptible of being sealed together when one end of the parison is pinched shut, to provide a container preform which is thereafter blown out against a mold to form a high-strength blow molded article.

While the parisons which can be heated in accordance with the instant invention can vary widely in wall thickness, the thickness will generally be in the range of 100—300 mils, preferably 120—175 mils.

The instant invention is of particular utility in forming biaxially oriented hollow articles wherein open ended hollow parison preforms are heated in accordance with the instant invention and thereafter transferred to a molding station. At this molding station, these parisons are gripped at one end to pinch shut the parison. They are gripped at the other end and stretched longitudinally to impart longitudinal orientation by means of relative axial movement between the two gripping means; they are then caused to expand to conform to the shape of a mold by the application of a pressure differential between the interior of the parison and the mold wall, thus imparting circumferential orientation to give a biaxially oriented product. This orientation process imparts as much as a 20 fold increase in the tensile strength to the plastic material. The small amount of material of the inner surface of the parison preform which is not at orientation temperature is not sufficient in quantity relative to the rest of the parison to have any appreciable effect on the improved strength imparted by the orientation process, and yet effects a remarkable improvement in the overall process in that it allows closing the end of the parison by means of a simple pinching operation as opposed to the more elaborate pinching means generally required in sealing a parison preform which is at orientation temperature, such as bringing the sealing means in toward a point from a plurality of directions and/or imparting flow along the seal line.

The crystalline melt point can be determined by heating a small piece of the plastic under a polarizing microscope. The specimen is heated slowly and the temperature at which birefringence disappears is the crystalline melt point.

The parison must be disposed in a substantially horizontal position and rotated during this heating step so as to effect even heating throughout the circumference of the parison. If, for any reason, it is desired to have slightly greater amount of heat at one end of the parison, the parison can be rotated at a slight angle to the horizontal, the higher end thus being heated slightly more, due to the natural effect of convention currents.

The rotating parison is disposed within a sleeve with an annular air space between the outer surface of the parison and the inner surface of the sleeve. In this way, wave lengths of radiant heat from the heating means which are not absorbed by the strike the outer sleeve, and thus are either reflected back against the parison or else serve to heat the sleeve and thus heat the air in the annular space, so as to conserve energy and increase the uniformity of the heating radially across the wall thickness of the parison which is highly desirable (except for the molten inner surface), as well as increase the speed with which the heating is effected. The sleeve can simply comprise a thin, metal tube such as copper; the sleeve may have insulation around it, and preferably contains an auxiliary heating means; however, the heat imparted to the parison from the outside must be less than the heat imparted from the inside. The essential feature is that the parison be substantially uniformly heated to a temperature just below its crystalline melting point with the inner surface, at least in the area to be sealed, being slightly hotter, so as to be in a molten, heat sealable condition.

The parison can be rotated at any speed sufficient to allow even distribution of the radiant heat and to impart a sufficient relative movement between the surface of the parison and the heated air. Speeds of 30 to 200, preferably 50 to 150, most preferably 100 to 120 revolutions per minute, are satisfactory. The relative air velocity at the outer surface of the rotating parison will vary, depending, of course, on the size of the parison. For a given size parison, a speed of rotation sufficient to give a relative air velocity of 5 to 100, preferably 10 to 50 feet per minute is satisfactory. A factor in determining the upper limit is the tendency for centrifugal force to cause distortion of the parison subsequent to contact with the sleeve or internal heater.

The annular space between the parison and the outer sleeve should be relatively small (so that only a small volume of air will have to be brought up to temperature and also to allow maximum use of air velocity currents to improve heat transfer and uniformity of heating), and yet allow free rotation of the parison without any dragging. An annular space between the parison and the sleeve of one-sixteenth -inch and an annular space between the parison and the internal radiant heating means of three-sixteenth -inch have been found to be satisfactory, although this exact spacing is not critical and can be varied. Values of 0.01 to 0.5 inch and 0.1 to 1 inch, respectively, can be used; these distances can be varied depending on the size of the parison, the uniformity of the parison, and the like.

The reason for the clearance difference is that when a heated parison is removed, the interior must not be allowed to touch the heater since the heater is hot and the interior of the parison is molten. Some dragging of the outside of the parison on the sleeve can be tolerated, if necessary, which might result from some sagging of a hot parison held only at one end on being removed. Such dragging is likely to occur at the far end which will be cut off or formed into the neck anyway. Also, insertion of cold parison over a hot heater requires a suitable clearance. For this reason, a greater clearance is required between the internal heater and the parison than is required between the parison and the sleeve.

The means to engage each end of the parison to hold it in position around the internal heating means and to effect rotation of the parison can be made of metal or any suitable structural material.

The heating time will generally be in the range of 1 to 10 minutes, preferably 1.5 to 4 minutes, and herein lies a second advantage to operating in accordance with the instant invention. The heating times of 1.5 to 4 minutes which are typical of operation in accordance with the instant invention are only a fraction of the times required for heating similar parisons in a conventional air oven.

In addition to making possible a temperature conditioning operation wherein the bulk of the thermoplastic material is at optimum orientation temperature and yet wherein the portion to be sealed is at a sufficiently high temperature to be sealable, and accomplishing this novel and unobvious and highly desirable result in a shorter amount of time rather than requiring a longer, more carefully controlled type of heating as might have been expected, a third novel and unobvious result flows from the instant invention. As has been previously noted, the most economical method of forming the parison preforms is to extrude a continuous length of tubing which is later severed into parisons of the desired length. Inherent in conventional tube extrusion techniques is the tendency for the outer surface of the tubing to be smooth and glossy whereas the inner surface has a dull appearance. While this is of no particular consequence so far as the tubing per se is concerned, it has been found that when such tubing is heated to orientation temperature and biaxially oriented to give a high-strength high clarity article, the beneficial effects of this process so far as clarity are concerned are compromised to some extent, due to the poor interior surface of the preform. By heating the parison from the inside with radiant heat in accordance with the instant invention, the inner surface is fused and caused to assume a smooth condition which enhances, even further, the clarity imparted by biaxial orientation.

By the term "molding station" as used throughout the specification, is meant either a single station where the heated parison is introduced into a mold and expanded by means of differential fluid pressure or a two or three-stage molding station where the parison is first stretched longitudinally to impart longitudinal orientation and then is introduced into a mold and caused to conform to the shape of the mold by introduction of fluid pressure into the interior of the parison. At some stage during this operation, the portion (if any) of the parison between the area pinched off to effect a seal and the end of the parison is severed and discarded.

During the time when a heated parison is being removed from the internal radiant heating means and a new parison is being inserted, the radiant heating means can be turned off or can be left on, in which case the radiation can serve to heat the air and the outer sleeve, and thus will not be wasted.

Since the primary source of heat in the process of the instant invention is an internal radiant heat source which, of course, radiates heat in straight lines from any given point, it is apparent that if the heat source is of equal intensity throughout its length and the length corresponds to the length of the parison, then the center of the parison would get hotter than the ends. It is essential to the operation of this invention that the parison be heated substantially uniformly to a temperature just below the crystalline melting point (except as already noted, the inner surface only is heated to a temperature at which it is molten). If there are two portions of the parison which are slightly hotter than the rest, these will form two separate bubbles when the parison is blown, which is extremely undesirable.

Uniform heating is difficult to achieve, particularly with a radiant heat source. One means to achieve this is to utilize an internal heating means which comprises a coil of resistance wire having taps at various points along its axial length so as to allow the flow of additional current through the end portions. In order to smooth out variations at the junction of the various zones, the resistance wire can be enclosed in a tube. While the primary function of such an arrangement is to provide even heating, this arrangement can also be used to achieve a slightly higher temperature in a single particular area if it is so desired. In addition, of course, it can be used to impart additional heat to an area of the parison which may be thicker than other areas. It is highly desirable to reheat the parison to a substantially uniform crystalline condition just below the melting point except for the inner surface which is preferably molten. Thus, it is ordinarily desired to have essentially no temperature gradient in a circumferential direction and the least possible gradient radially through the wall thickness of the parison except for having the inner surface molten. In the longitudinal direction, it is most undesirable to have two or more areas which are hotter than the rest since two bubbles will form and cause a poorly formed part. Generally it is preferred to have one area which is very slightly hotter than all the rest, this spot being selected in the area which is to be stretched the least. The bubble will then initiate at this point on application of a pressure differential and will spread to the remainder of the parison as it is blown out against a mold wall, and in so doing, a more uniform distribution of polymer in the wall of the finished article is achieved.

Another means to achieve uniform heating of the parison is to utilize a radiant heat source emitting a constant amount of heat along its axis and to enclose a portion of the heat source in a shield, the shield covering progressively less of the radiant heat source in the area from the center of the heat source toward each end.

Referring now to the FIGS, particularly FIG. 1, there is shown a rotating parison heating assembly 10. Elongated radiant heating means 12 is held by support means 14. Parison 16 is held initially by first rotating member 18 by means of flexible fingerlike prongs 20. Member 18 is also axially movable so as to insert parison 16 over heating means 12, the other end of the parison being held within a sleeve 21 having a tapered guide end on second rotating member 22. Members 18 and 22 rotate, for instance in the direction shown by the arrows, thus rotating parison 16 about radiant heating means 12. Copper sleeve 24 surrounds parison 16 leaving an annular space 26 between the inner surface of said copper sleeve and the outer surface of the parison. Insulation 28 is provided around copper sleeve 26. Auxiliary heating means 30 can be utilized to heat sleeve 24, if desired.

Figure 2:
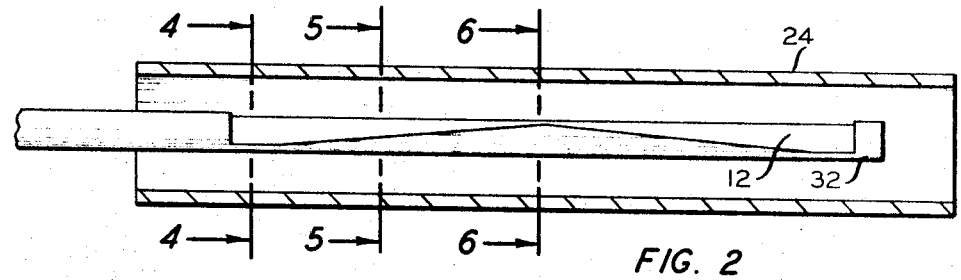
FIG. 2 is a view partially in cross section of the apparatus of FIG. 1 with a shield surrounding a portion of an internal heating means.
Figure 3:
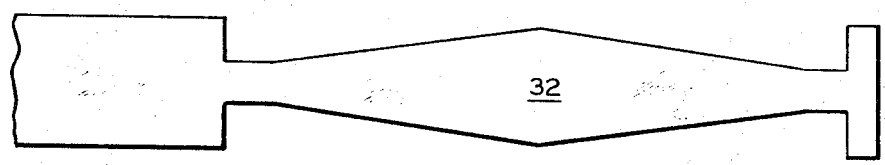
FIG. 3 is a plan view of the heating shield of FIG. 2 prior to being affixed around the heating means.
Figure 4:
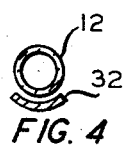
FIGS. 4, 5, and 6 are sectional views at various stages along the axis of the apparatus shown in FIG. 2.
Figure 5:
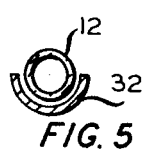
Figure 6:
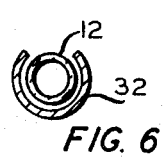

In FIG. 2, there is shown copper sleeve 24 and heating means 12 with no parison present. Around heating means 12 is contoured heat shield 32. FIG. 3 shows shield 32 prior to being affixed around heating means 12. FIG. 4, 5, and 6 show more clearly the relative position of heat shield 32 about heating means 12.

Figure 7:
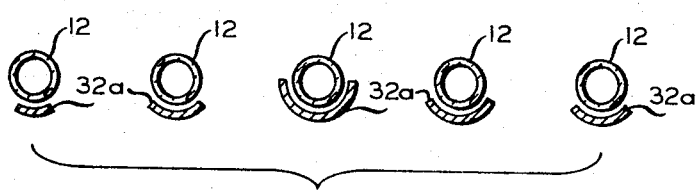
FIG. 7 represents cross-sectional views similar to those in FIGS. 4, 5, and 6, except that the heat shield is unsymmetrical.

FIG. 7 shows a series of cross sections through an apparatus similar to that of FIG. 2, except wherein heat shield 32a is not symmetrical so as to allow greater heating in one area, for instance, in an area where the parison is programmed to have a greater thickness.

Figure 8:
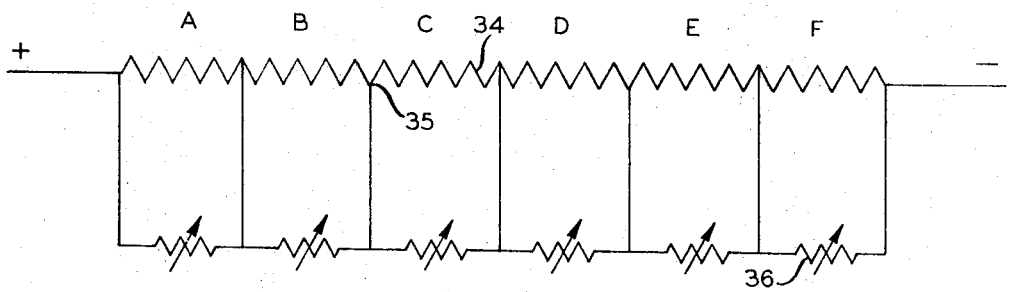
FIG. 8 is a schematic representation of the heating coils and temperature control means for the heating means of FIG. 1.

FIG. 8 shows a schematic representation of the heating elements and control system for the radiant heating means of FIG. 1. Here is shown resistance element 34 having taps 35 at various points along its length to allow shunting of a portion of the current around various zones. Variable resistance means 36 make possible the adjusting of the heat in each zone. In addition, the various zones can have different numbers of coils.

Figure 9:
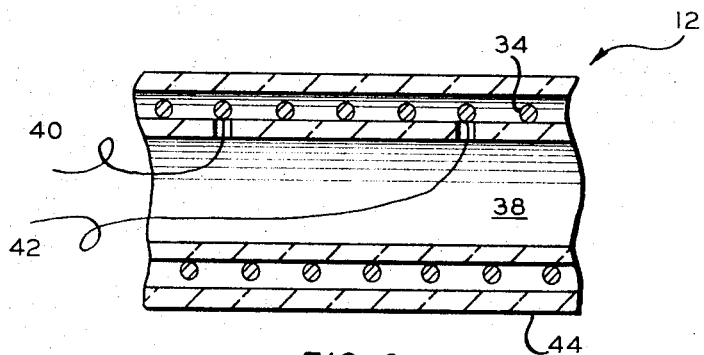
FIG. 9 is a cross-sectional view of a portion of the internal radiant heating means of FIG. 1.

FIG. 9 is a cross-sectional view of a portion of elongated radiant heat means 12 of FIG. 1. Here it is shown that elongated radiant heat means 12 comprises a central quartz core 38 around which is wound the coils of resistance wire 34. Leads 40 and 42 allow tapping into resistance element 34 at appropriate points. Surrounding resistance element 34 is quartz tube 44. If desired, for instance to provide an internal heating means of smaller diameter, axially disposed loops of resistance wire can be kept in place of coils. This heating means is generally kept at a temperature of 500°—700° F., preferably about 550° F., for treating polypropylene parisons, with the temperature of sleeve 24 (see FIG. 1) being kept at about 30°—400° F., preferably about 360° F. for polypropylene. Higher temperature for the heating means reduce the leeway in cycle time, whereas lower temperatures are inefficient and unduly extend the total cycle time.

Figure 10:
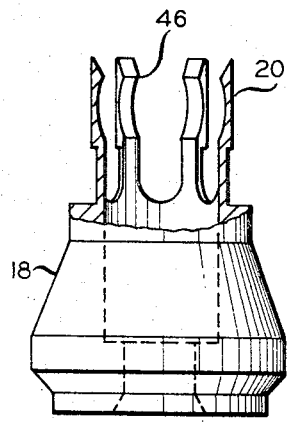
FIG. 10 is a partial section of a rotating member which holds one end of a parison.

Referring now to FIG. 10, there is shown in partial section rotating member 18 having flexible fingerlike prongs 20. Prongs 20 are contoured so as to provide a ridge 46 which can embed slightly in the heated parison. By being flexible, the prongs can slip over a cold parison and hold it tightly. Ridge 46 embeds itself in the parison outer surface sufficiently to give it a sufficient hold to pull the heated parison out of the heating chamber without being so tightly held that it cannot be slipped off when the parison is transferred to a molding station. The rotating members can be one piece or an insert such as insert 48 can be provided as a stop for the parison; by making this insert of polytetrafluoroethylene or other low heat conductivity material, undesirable cooling of the ends of the parison can be avoided.

EXAMPLE I

Propylene homopolymer having a density of 0.905 (ASTM D 1505-63T), a melt index of 2 (ASTM D 1238-62T, Condition L), and a crystalline melting point of 340° F. was extruded into tubing having an internal diameter of 0.8 inch and a wall thickness of 0.125 inch. The tubing was cooled to room temperature and cut into 5 inch lengths. One of these 5 inch lengths was positioned in a heating means, such as shown in FIG. 1, having the type of internal radiant heating means shown in FIG. 9. The rotating members such as those depicted by reference characters 18 and 22 of FIG. 1 were rotated so as to rotate the parison at a rate of 120 r.p.m. The parison was heated to orientation temperature in 3.4 minutes. The interior of the parison was fused so as to give a smooth surface. The heated parison was transferred to a molding station where one end was pinched shut. It was then stretched laterally, the mold closed about it, and differential pressure introduced into the interior of the parison so as to blow it out against the mold walls.

EXAMPLE II

A similar parison to that of example I was heated on similar apparatus wherein the elongated heating means had 6 zones in the resistance element as shown in FIG. 8. Going from left to right, there were respectively 12, 11, 10, 10, 10, and 12 turns in the resistance wire for each zone. The setting of the resistance, in ohms, in the shunt circuits for the zones from left to right were as follows: 51, 27, 27, 33, 34, and 110. The voltage was 45 volts and the total amps 0.95. The heating time was 2.5 minutes. In another run, the settings were respectively: 58, 28, 26, 33, 23, and infinity. The voltage was 49 volts and the amps 1.1. The heating time for the parison was 2.0 minutes.

Parisons identical to those used in examples I and II were heated in conventional air oven heating systems with the time required to bring the parison to the same temperature being 15 minutes. In addition, the parisons heated in the conventional air oven were more difficult to seal because the interior was not fused. There was no measurable difference between the strength of the wall sections of bottles blown from in accordance with the instant invention and bottles made from parisons heated in a conventional air oven.

However, sections were cut from the bottom of bottles made as shown in this example and compared with sections cut from the bottom of bottles made from identical parisons in an identical molding station, the only difference being the parisons for the control bottles were heated in an air oven. On impact, the bottom sections of the bottles made from parisons heated in an air oven parted along the seal line whereas the sections made from parisons heated in accordance with the instant invention could not be parted along the seal line, i.e., the seal area was stronger than the surrounding area.

A visual examination of these bottles of examples I and II made from parisons heated in accordance with the instant invention revealed that the clarity was superior to that of the bottles made from parisons heated in an air oven.

While this invention has been described in detail for the purpose of illustration, it is not to be construed as limited thereby, but is intended to cover all changes and modifications within the spirit and scope thereof.

I claim:

1. Apparatus for heating a tubular parison comprising in combination: an elongated radiant heating means disposed in a substantially horizontal plane within a sleeve, said sleeve being of such size that an annular space is present between the inner surface of said sleeve and the outer surface of said tubular parison; a first rotatable member having a first parison holding means thereon, said first rotatable member being axially moveable toward and away from a first end of said elongated heating means; a second rotatable member concentric with said first rotatable member and said heating means and having a second parison holding means thereon; and means to support said elongated radiant heating means within a tubular parison held by said first and second rotating means.

2. Apparatus according to claim 1 wherein a shield is disposed around said elongated radiant heating means, said shield covering a greater area of said elongated radiant heating means in the center than at the ends.

3. An apparatus according to claim 1 wherein said elongated radiant heating means comprises a resistance heating element having a plurality of taps and means to individually adjust current flowing between each of said taps.